H. L. MILLER.
DRAFT GEARING.
APPLICATION FILED OCT. 13, 1909.
973,451.
Patented Oct. 18, 1910.
2 SHEETS—SHEET 2.
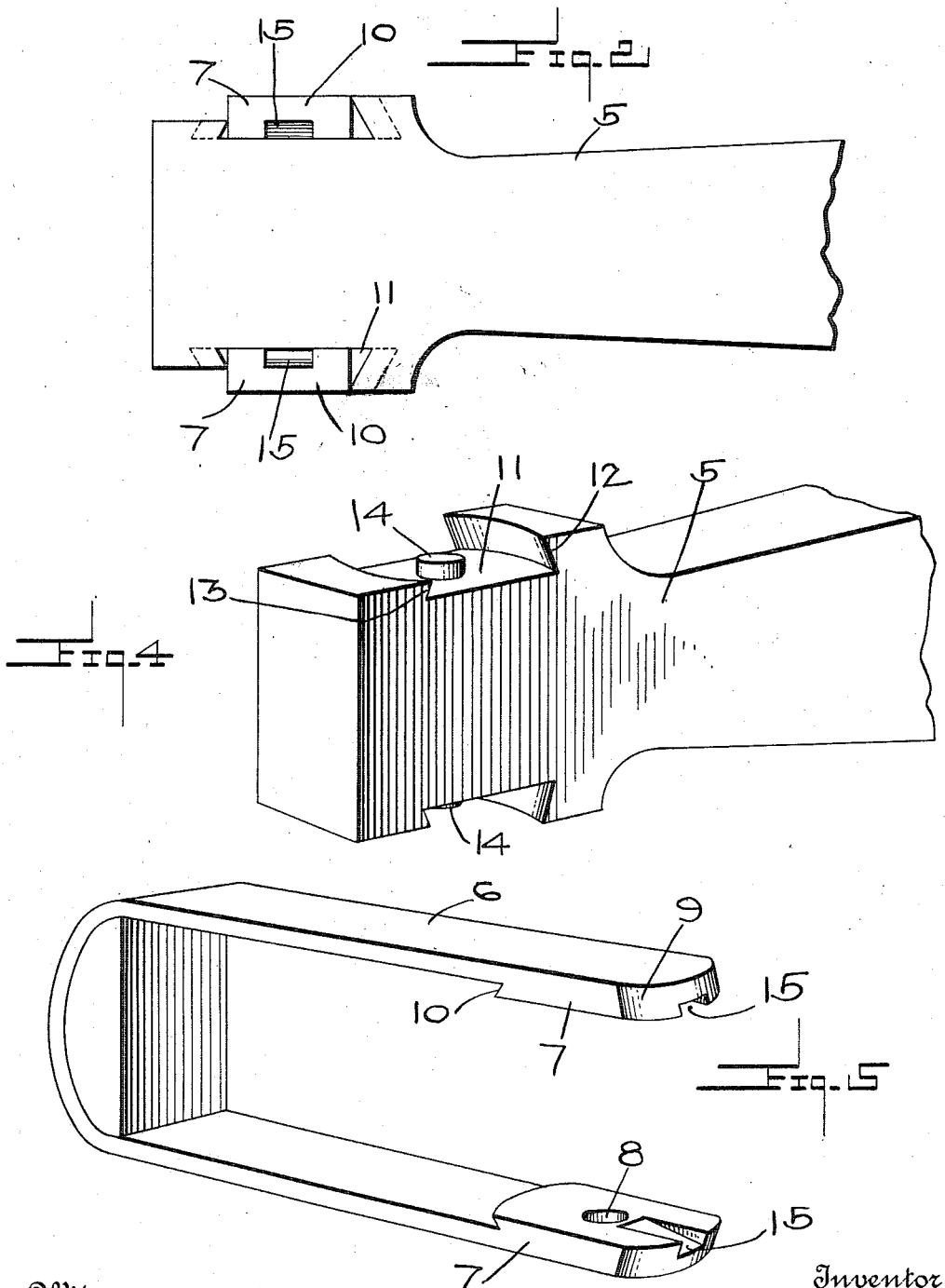
Witnesses
Ed. R. Lusby
E. Hurst
Inventor
H. L. Miller
by Woodward & Chandler
Attorneys

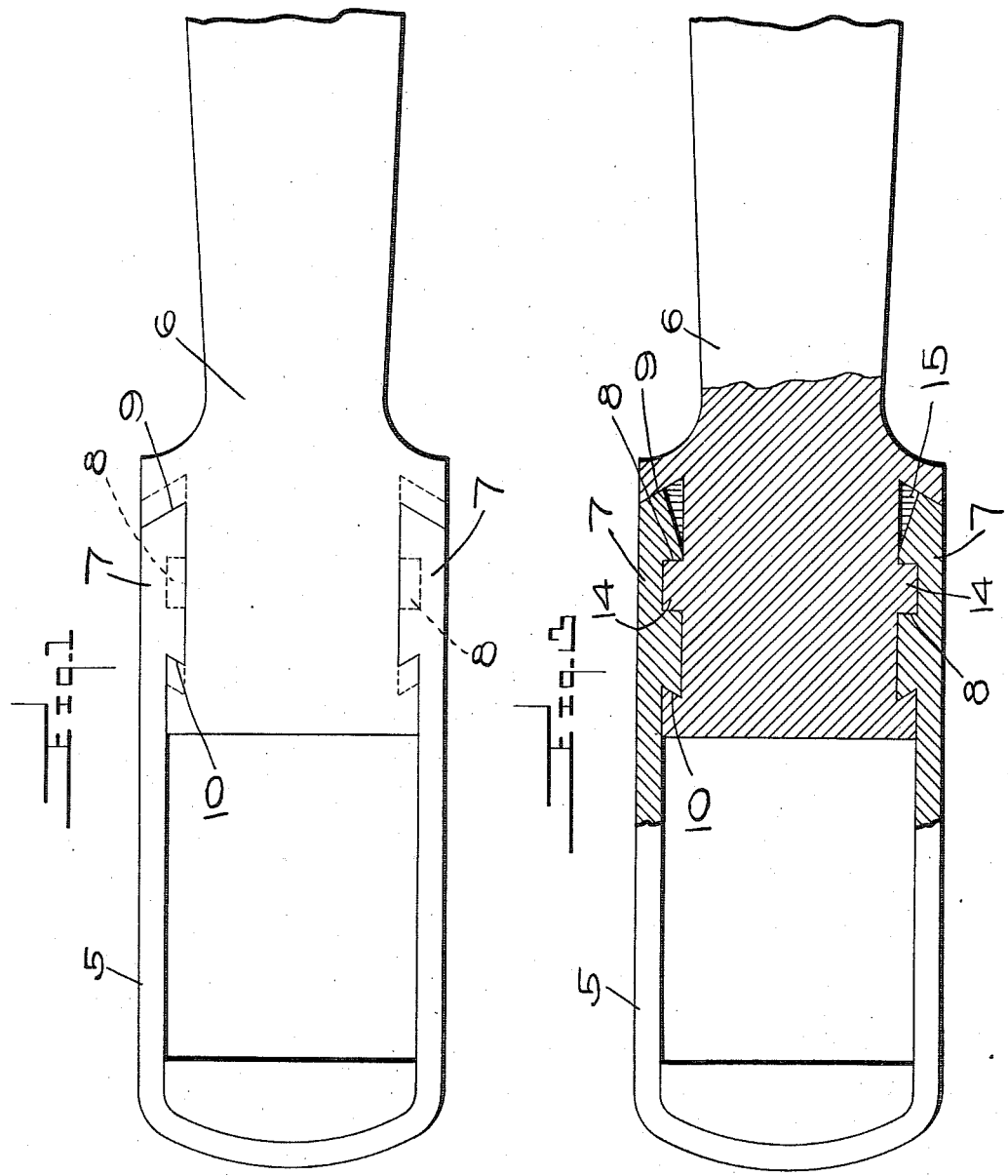

UNITED STATES PATENT OFFICE.

HUBERT L. MILLER, OF CUMBERLAND, MARYLAND.

DRAFT-GEARING.

973,451.   Specification of Letters Patent.   Patented Oct. 18, 1910.

Application filed October 13, 1909. Serial No. 522,361.

*To all whom it may concern:*

Be it known that I, HUBERT L. MILLER, a citizen of the United States, residing at Cumberland, in the county of Allegany and State of Maryland, have invented certain new and useful Improvements in Draft-Gearing, of which the following is a specification.

This invention relates to new and useful improvements in draft gearing, and more particularly to improved means for connecting the yoke and the butt-end of a coupler, the primary object of my invention being to so construct these parts, that the interlocking connection of the yoke and coupler may be effected without the employment of any third part.

Another object is to provide an improved construction of this character, whereby the yoke and draft bar of the coupler may be securely connected against any possibility of disengagement, but may be easily disconnected when desired.

A further object is to greatly simplify and strengthen the connecting parts, and to provide a more efficient and convenient means of applying the yoke to the rear end of the draft bar, and of getting the maximum strength, with a minimum amount of weight.

A further object is to provide a draft gearing wherein the parts are so constructed as to permit of the locking connection of the yoke and coupler, whereby the yoke may have transverse pivotal movement on the coupler bar to prevent breakage of the yoke when the train is upon a curve.

With these and other objects in view the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification and in which like numerals of reference indicate similar parts in the several views, Figure 1 is a side elevation illustrating my improvements. Fig. 2 is a similar view showing the yoke at right angles to the coupler. Fig. 3 is a vertical longitudinal section. Fig. 4 is a detail perspective view of the butt-end of the coupler. Fig. 5 is a similar view of the yoke.

Referring to the drawings 6 indicates the yoke and 5 the butt-end of the coupler. The yoke has formed upon its ends the bosses or enlargement 7, in the center of which a circular recess 8 is provided. The extreme end of the boss 7 is inclined across the entire width thereof, and the other end thereof is inclined in the opposite direction, but extends only one half the depth of the outer ends, or to the under sides of the yoke. These inclined surfaces are designated 9 and 10 respectively, and are concentrically disposed with relation to the recess 8.

The butt-end of the coupler is provided with the transverse grooves 11 on the upper and lower faces thereof. The walls of these grooves are inclined in parallel relation to the inclined ends of the bosses 7, as shown at 12 and 13 and likewise extend the entire width of the coupler. In the center of the grooves 11, studs or lugs 14 are formed and are adapted to be received in the recesses 8 provided in the ends of the yoke. It will be observed that the inclined faces of the bosses and grooves are of the same depth, whereby a flush upper and lower surface will be presented when the yoke has been properly connected. The extremities of the yoke are formed with the longitudinally extending notches 15, which are extended inwardly to the recesses 8. This construction will greatly facilitate the connecting of the yoke and coupler, and obviate the necessity of placing too great a strain upon the parallel yoke bars.

In assembling or connecting the parts, the yoke is disposed at a right angle to the coupler as is shown in Fig. 2 and the side bars thereof forced inwardly upon the lugs 14. It will be noted that the bottom of the recesses or notches 15 is inclined, and as continued pressure is exerted upon the yoke, the lugs 14 engaging in these recesses will gradually force the parallel side bars of the yoke apart, until the lugs are disposed in the recesses formed in the butt-end of the coupler. The yoke is now swung inwardly, the lugs serving as a pivot therefor, until it is disposed in longitudinal alinement with the coupler. The inclined ends of the bosses and the similarly inclined faces of the recesses will then be coengaged, whereby any vertical movement or disengagement of the coupler and yoke will be prevented. When it is desired to separate the yoke and coupler, this operation is, of course, exactly reversed.

The relative proportions of the various parts will of course, be determined in accordance with the requirements and the uses to which it is to be subjected.

From the foregoing it will be seen that I have provided a novel construction which is strong and durable, and will offer considerable resistance to the great strains which devolve upon devices of this character. It is extremely simple, but highly efficient in its operation. It may also be very quickly connected or disconnected, and the necessity of repairs is reduced to a minimum.

By pivotally connecting the yoke and coupler bar as above described, a transverse pivotal movement of the yoke on the coupler bar will occur as the train is rounding a curve. This movement is very slight, there being no possibility of the yoke turning to such an extent as to become disconnected from the coupler. In this manner all shearing strain upon the lugs 8 is prevented, greatly increasing the efficiency and durability of the device.

What is claimed is:

1. The combination with a draft bar having grooves in its opposite faces, of a yoke, bosses formed upon the ends of said yoke adapted to have locking engagement in said grooves, lugs upon the ends of said draft bar, said bosses having recesses formed therein to receive said lugs, and notches formed in said bosses having engagement with said lugs when the yoke is disposed at right angles to the coupler and adapted to facilitate their insertion into the recesses formed therein.

2. The combination with a coupler having transverse grooves in the top and bottom thereof, the walls of said grooves being inclined in opposite directions, of a yoke, bosses formed on the ends of said yoke, the ends of said bosses being inclined in parallel relation to the walls of said grooves, lugs formed upon said coupler and centrally disposed in said grooves, said bosses having recesses formed therein, notches in the ends of said bosses communicating with said recesses, the bottoms of said notches being inclined and adapted to engage with said lugs when the yoke is disposed at right angles to the coupler, said lugs having sliding contact with the bottoms of said recesses whereby the arms of the yoke will be sprung apart and the lugs engaged in said recesses, the inclined ends of said bosses and the walls of said grooves having locking engagement when the yoke is turned into alinement with the coupler.

In testimony whereof I affix my signature, in presence of two witnesses.

HUBERT L. MILLER.

Witnesses:
RALPH WILLARD,
CHAS. E. METZ.